UNITED STATES PATENT OFFICE.

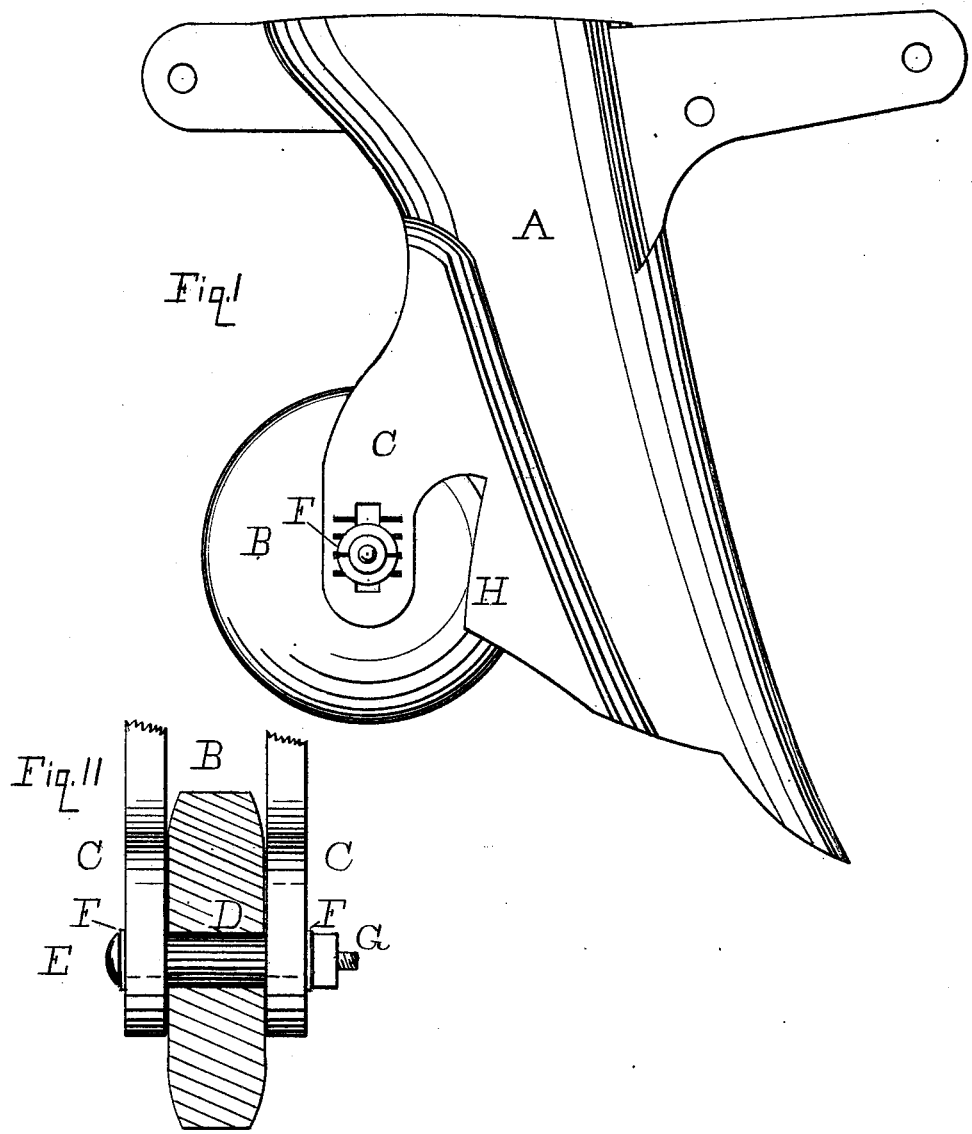

ANANIAS LANDIS, OF SALEM, OHIO.

IMPROVEMENT IN GRAIN-DRILL HOES.

Specification forming part of Letters Patent No. 206,884, dated August 13, 1878; application filed January 11, 1878.

*To all whom it may concern:*

Be it known that I, ANANIAS LANDIS, of the village of Salem, in the county of Montgomery and State of Ohio, have invented a new and useful Improvement in Grain-Drill Hoes, of which the following is a specification:

The nature of my invention consists in attaching a roller to the rear of a grain-drill hoe, the same being supported on arms that admit of adjustment of the same, with a view to regulate the depth the hoe may enter the soil.

Figure I is a side elevation of the grain-drill hoe. Fig. II is a rear view of the arms and roller of the same.

Like letters of reference on the drawing designate like parts of the different figures.

A represents a grain-drill hoe, which is substantially the same as those in general use, with the exception that arms C are attached to the rear, and also wings H, which partially cover the front of the roller. In use the hoe may be attached to any form of grain-drill, and is secured and operated precisely as are other hoes.

The arms have longitudinal slots, and on the outside are a series of shallow grooves. The washers F have slight projections, which enter one of the series of these grooves. The thimble D fills the space between the arms, and this thimble serves as the pivot for the roller. The bolt E is passed through these parts, and is made to hold the pivot by tightening the nut, so that the pivot is held firmly between the arms. The washers entering the grooves as described, the pivot is securely held in a fixed position.

The adjustment with a view to regulating the depth the hoe shall enter the soil is by loosening the nut and placing the washers in whatever groove it may be desirable to place them.

To understand the operation, it is necessary to contemplate the hoe in use as attached to a grain-drill. The hoe penetrates the earth until the roller carries the principal weight, and here the downward motion is arrested. The wings prevent clods falling immediately behind the hoe, and the roller, rolling down the fine earth, leaves a uniform covering over the grain, and a channel is formed, which gradually fills, and thereby prevents the wheat being so injuriously affected during the winter.

Having fully described my invention, what I desire to secure by Letters Patent is—

The grain-drill hoe A, having arms C and wings H, roller B, pivot D, washers F, and bolt E, constructed and arranged substantially as set forth.

ANANIAS LANDIS.

Witnesses:
 B. PICKERING,
 W. H. CLARK.